July 8, 1958 J. W. GIBSON ET AL 2,842,500

METHOD OF MAKING FERRITE STRUCTURES

Filed Jan. 23, 1956 2 Sheets-Sheet 1

*INVENTORS*
JOHN W. GIBSON
KENNETH A. LUNDBERG
*BY* William V. Schellberg
AGENT

METHOD OF MAKING FERRITE STRUCTURES

Filed Jan. 23, 1956 2 Sheets-Sheet 2

*INVENTORS*
JOHN W. GIBSON
KENNETH A. LUNDBERG
*BY* William V. Schellberg
AGENT

United States Patent Office 2,842,500

Patented July 8, 1958

2,842,500

METHOD OF MAKING FERRITE STRUCTURES

John W. Gibson, West Park, N. Y., and Kenneth A. Lundberg, Albuquerque, N. Mex., assignors to International Business Machines Corporation, New York, N. Y., a corporation of New York Application January 23, 1956, Serial No. 560,609

7 Claims. (Cl. 252—62.5)

Figure 1:
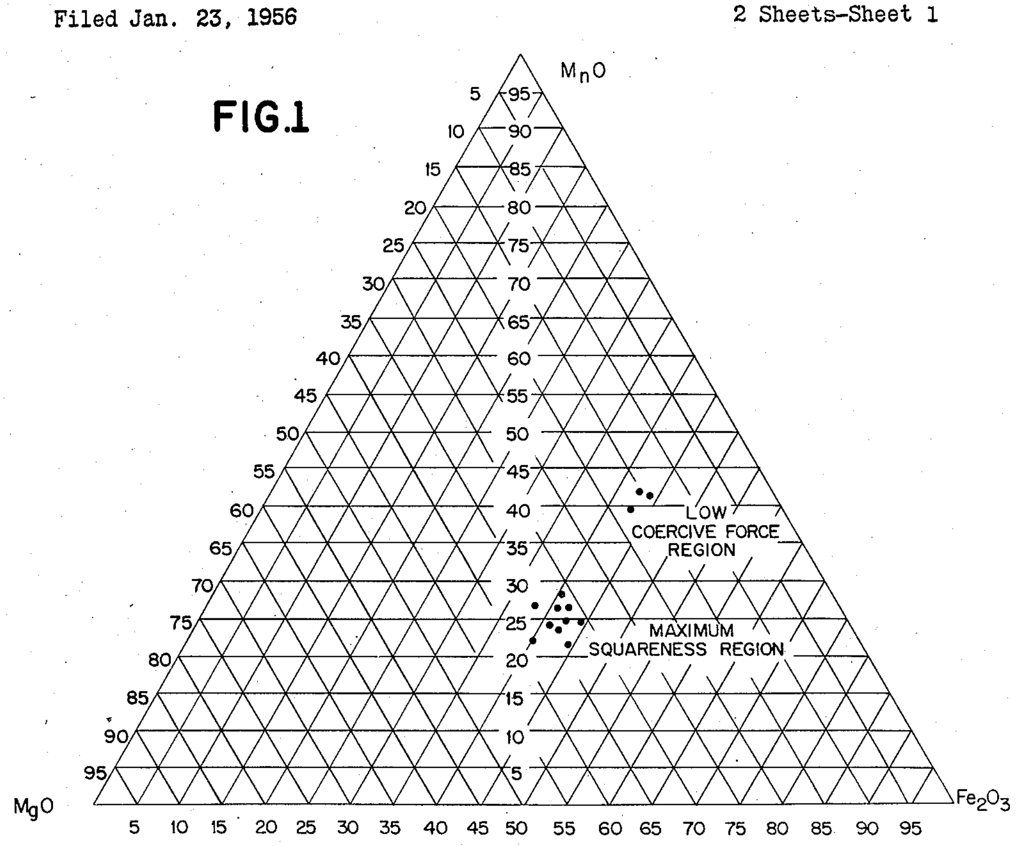
Figure 2A:
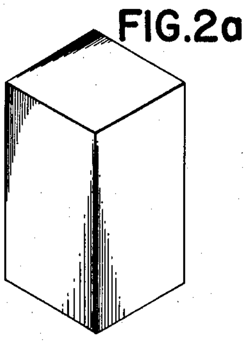
Figure 2C:
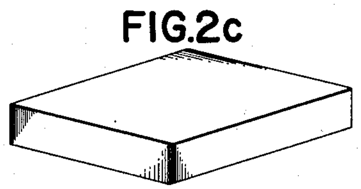
Figure 2E:
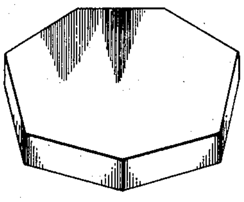
Figure 2B:
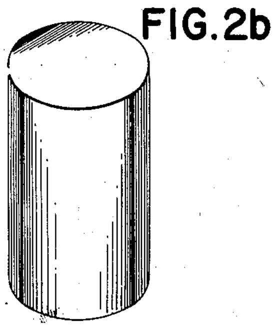
Figure 2D:
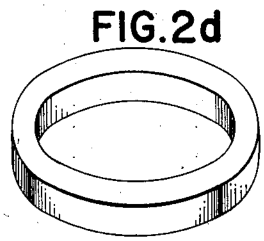

This invention relates to ferrite materials of the type employed for memory purposes as described in the copending United States application Ser. No. 462,716, filed October 18, 1954, now abandoned, to which this application is related as a continuation in part.

In matrix memory systems, a coordinate array of magnetic cores is threaded by a grid of horizontal and vertical selection winding wires with information stored in and delivered from a particular core by applying a current pulse to a selected horizontal winding and to a selected vertical winding. The effect of the energized windings is additive only on a single core to cause a change in its remanent state but the effect of one winding alone on all other cores that are linked by the energized pair must be insufficient to cause any significant magnetic change in them. This factor is determined by the coercive force threshold of the cores employed. It is desirable that the current pulse be large in order to lower the switching time of the selected core yet the coercive threshold must not be exceeded and, as a consequence the hysteresis characteristics of the memory cores desirably are nearly rectangular and have sharply defined knees.

It is well known to utilize materials comprising ferromagnetic ferrites for magnetic devices, which ferrites are manufactured by sintering together a mixture of constituents containing an iron compound and one or more further metal compounds, as for example, a mechanical mixture of metal oxides. Such magnetic devices contain no metal particles and provide the advantage of poor electrical conductivity, which reduces eddy current losses to a negligible value, while retaining the desired magnetic characteristics.

In accordance with the invention, ferrite elements are prepared from a mixture of $Fe_2O_3$, MnO, and MgO in varying percentages in a manner to provide a generally rectangular hysteresis loop characteristic with more sharply defined knees than heretofore obtained.

In forming magnetic elements from pressed sintered metallic oxides it has been determined that the supporting member used when the elements are heated to a sintering temperature may affect the hysteresis characteristics adversely. Conventional refractory support materials are believed to contaminate the material and, in accordance with the invention, rhodium, platinum and alloys thereof are used with marked improvement.

An object of the invention then, is to provide an improved process for manufacturing ferrite bodies wherein a sharp transition is obtained in switching from one residual state to the other.

Other objects of the invention will be pointed out in the following description and claims and illustrated in the accompanying drawings, which disclose, by way of example, the principle of the invention and the best mode, which has been contemplated, of applying that principle.

In the drawings:

Figure 1 is a graphical illustration of compositions useful in the present invention which indicated optimum percentage ranges of the several constituent metal oxides.

Figures 2*a* to 2*e* are perspective views of examples of compressed bodies made of compositions within the scope of the invention.

Figure 3:
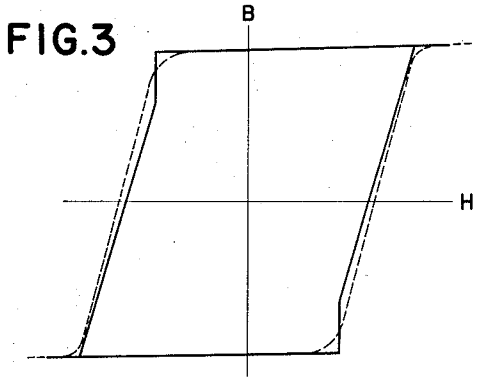

Figure 3 is a graphical illustration of the hysteresis characteristics obtained, with the curve shown in solid lines that developed through use of a particular support material during the sintering step whereby a sharp transition is obtained in switching from one residual state to the other.

Figure 4A:
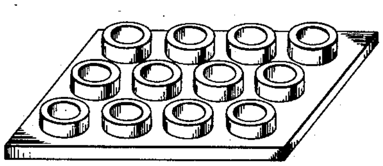
Figure 4B:
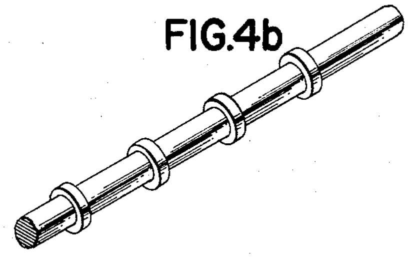
Figure 4C:
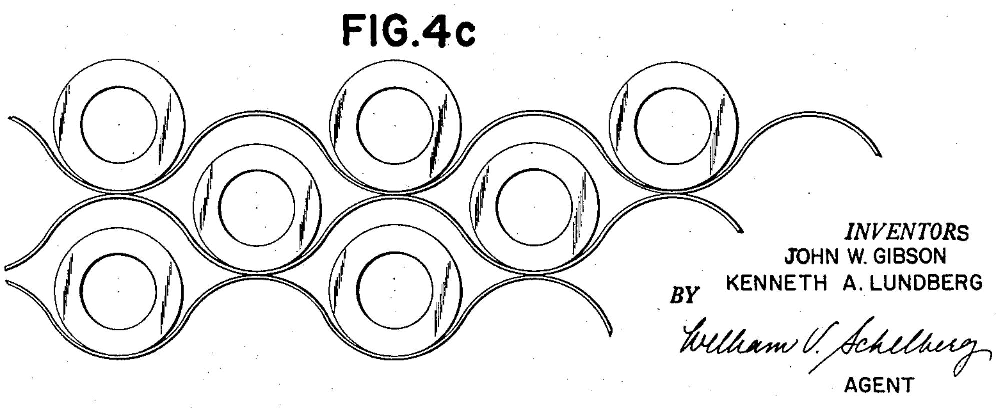

Figures 4*a* to 4*c* are views showing several modified forms of supports employed during sintering.

The production of ferrite bodies is similar to that of ceramic articles with the various oxides mixed and ground in ball mills for an extended time after which the resulting powder is pressed or extruded into the desired shape while in a green state and then fired at a sintering temperature.

As indicated in the diagram of Figure 1, maximum squareness of the hysteresis loop is obtained with a composition having a range of proportions of $Fe_2O_3$ between 30 and 50 mol percent, MgO between 25 and 40 mol percent and MnO between 15 and 40 mol percent. The oxide materials being of a so called reagent grade.

Minimum coercive force is obtained with a composition having a range of proportions of $Fe_2O_3$ between 35 and 50 mol percent, MgO between 10 and 20 mol percent and MnO between 35 and 50 mol percent.

A preferred embodiment within each of the ranges specified is given in the following table:

| $Fe_2O_3$, mol percent | MgO, mol percent | MnO, mol percent |
|---|---|---|
| 40.0 | 37.5 | 22.5 |
| 42.5 | 15.0 | 42.5 |

Briefly, the method includes the intimate mixing of the oxides in the proportions indicated, each in a fine state of subdivision. This may be accomplished by ball milling from four to eight hours in a water slurry comprising one part dry mix to four parts water with the resultant mixture thereafter spread thin to limit fractional settlement and oven dried at about 250–350° C. for a period of twelve hours. Alternative mixing procedures may be employed, with the caked material then broken up and calcined in air at approximately 970° C. to 1000° C. for one hour or more to form the spinel crystalline structure. Temperatures of from 900° C. to 1500° C. may be used with the period of time varied accordingly. The large agglomerates are then broken down and a small percentage of lubricant material such as a monocrystalline wax or magnesium stearate and polyvinyl alcohol is added to reduce skin friction and warping during molding. The molding operation may be performed by application of large pressures and a fairly wide range of pressures may be used. In general, it may be said that the pressure of forming should be sufficient to provide a closely coherent body and should be sufficient to obtain this result.

In the molding operation described the powder may be formed into bars having either rectangular or cylindrical cross section, into toroids or flat slabs etc., as illustrated in Figures 2*a* to 2*e*, with dies and plungers of appropriate shape.

The body formed as described, is in a so called green state and must be fired for a further period of approximately one half hour at 1450° C. as in the conventional procedure. Lower temperatures may be employed, however, with a proportionately longer firing time. Normally, after the green body is removed from the press, it is heated slowly to about 100° C. and held at this temperature until all moisture has evaporated. The temperature is then raised to 350° C. and held for fifteen minutes before increasing to between 1425° C. and 1450° C. where it is held for three to four hours before quenching.

As a result of the procedure described, ferrite bodies of superior properties and approaching more nearly the optimum square hysteresis characteristic are formed.

It has been determined that the material employed for supporting the green magnetic body during the sintering step of this process develops a marked effect upon the magnetic characteristics of the finished product. Conventionally, a refractory ceramic boat or support made of such materials as alundum, zirconium or silicon carbide is used, with a hysteresis characteristic obtained having a general shape as indicated by dotted lines in Figure 3. Such a hysteresis loop indicates a markedly high ratio of residual to saturation flux density and is desirable in memory applications where one residual magnetic state is utilized for representing binary one information and the other residual state for representing binary zero information.

The use of a supporting medium comprising rhodium, platinum or alloys thereof, for example, 50% platinum and 40% rhodium, has been found to improve the hysteresis characteristic of the magnetic bodies in that a sharp transition is obtained in switching from one state of saturation to the other as exemplified at the knees of the hysteresis loop shown in solid lines in Figure 3. This property is of considerable importance in memory systems where coincident current selection is employed as the effects of current pulses approaching the full coercive force develop little or no resultant flux change.

The exact reason for the variation in characteristics obtained through the use of rhodium, or platinum support materials is not known, however, it is believed that some catalytic action takes place while the refractory materials are thought to contaminate the body.

Several forms of rhodium and/or platinum support members have been used and are illustrated in Figures 4*a* to 4*c*, with that form shown in Figure 4*c* considered most desirable since the corrugated trays may be stacked upon one another and are more adapted to mass production technique since a minimum of handling is required.

While the hysteresis loops illustrated in Figure 3 graphically indicate the improved squareness obtained with employment of platinum and/or rhodium materials for supports during sintering, the following tables show exemplary electrical measurements which also point out the desirable result. In the tables item $I_m$ represents the amplitude of a full drive current pulse in excess of the threshold in amperes, $V_{id}$ the output in millivolts obtained when a binary one state is read out after being disturbed eight times with a half select pulse, $V_{od}$ the output in millivolts obtained when a binary zero state is read out after being disturbed eight times as measured at the peaking time of a one disturbed output. The $V_{id}/V_{od}$ ratio is a measure of the loop squareness and indicates the relative slope of the horizontal portions of the loop including the portion at the knee since $V_{id}$ is a measure of $2B_r$ less the flux change caused by disturbing the core in the direction of the knee and $V_{od}$ is a measure of the flux change caused by disturbing in the direction of the knee.

*Table I*

| $I_m$ | $V_{id}$ | $V_{od}$ | $V_{id}/V_{od}$ | Composition (mol percent) $Fe_2O_3$, 43.3% MnO, 24.4% MgO, 32.3% |
|---|---|---|---|---|
| .70 | 75.0 | 15.0 | 5.0 | Core #1 (fired on ferrite support). |
| .70 | 66.0 | 18.0 | 3.6 | Core #8 (fired on zirconium support). |
| .70 | 43.5 | 6.0 | 7.2 | Core #17 (fired on alundum support). |
| .70 | 61.5 | 3.0 | 20.5 | Core #21 (fired on platinum support). |

*Table II*

| Optimum $I_m$* | $V_{id}$ | $V_{od}$ | $V_{id}/V_{od}$ | Composition (mol percent) $Fe_2O_3$, 43.3% MnO, 24.4% MgO, 32.3% |
|---|---|---|---|---|
| .70 | 75.0 | 15.0 | 5.0 | Core #1 (fired on ferrite support). |
| .65 | 45.5 | 13.5 | 4.1 | Core #8 (fired on zirconium support). |
| .75 | 42.5 | 6.0 | 8.7 | Core #17 (fired on alundum support). |
| .75 | 75.0 | 3.0 | 25.0 | Core #21 (fired on platinum support). |

*Optimum $I_m$ being that drive current magnitude that results in the highest $V_{id}/V_{od}$ ratio for the particular core.

In Tables I and II are shown the effects of using different support materials upon the magnetic properties of nearly identical cores formed of the same ferrite composition and pressed by the same equipment under identical conditions. It is to be noted that the ratio $V_{id}/V_{od}$ for the core fired on a platinum support is much greater than that obtained with any one of the other support materials.

*Table III*

| $I_m$ Optimum | $V_{id}$ | $V_{od}$ | $V_{id}/V_{od}$ | Composition (mol percent) | | | |
|---|---|---|---|---|---|---|---|
| | | | | $Fe_2O_3$ | MgO | MnO | Code No. |
| 1.20 | 158 | 9.1 | 17.3 | 40.0 | 37.5 | 22.5 | 103 |
| 1.05 | 166 | 14.0 | 11.8 | 42.5 | 25.0 | 32.5 | 106 |
| .82 | 145 | 13.0 | 11.1 | 42.8 | 32.0 | 25.2 | X1 |
| .77 | 107 | 8.2 | 13.0 | 42.0 | 33.5 | 24.5 | 111 |

Table III contains values comparable to those of Table II, wherein optimum driving current magnitude is selected, for a few examples of other compositions within the magnesium-manganese ferrite series range with the sintering step carried out with the cores supported on a rhodium-platinum alloy member in accordance with the invention. It is to be noted here that the $V_{id}/V_{od}$ ratio remains large in all instances.

A further advantage provided by the use of a rare metal support resides in the ability to more readily control the rate of cooling of the sintered body. Refractory support members generally comprise a large mass of material and consequently have a lower proportion of surface area to volume in contrast to the metallic support and such support members are subject to fracture if the cooling rate is high.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method of forming a magnetic body characterized by having improved magnetic properties comprising, preparing an intimate mixture of 35 to 50 mol percent $Fe_2O_3$, 10 to 40 mol percent MgO and 15 to 50 mol percent MnO, heating said mixture to form a spinel type crystalline structure, forming a molded compressed body from particles of said spinel type crystalline material, supporting said body on a rare metal member consisting primarily of platinum metal, and subsequently sintering said molded body.

2. A method of forming a magnetic body characterized by improved magnetic properties comprising, preparing an intimate mixture of 35 to 50 mol percent $Fe_2O_3$, 10 to 40 mol percent MgO and 15 to 50 mol percent MnO, heating said mixture to form a spinel type crystalline structure, grinding the material, wetting the ground material with a binder solution, forming a molded compressed body from said wetted material, supporting said body on a member comprising an alloy of rhodium and platinum material, and subsequently sintering said molded body.

3. A method of forming a core body characterized by having improved magnetic properties comprising preparing an intimate mixture of from 35 to 50 mol percent $Fe_2O_3$, 10 to 40 mol percent MgO, and 15 to 50 mol percent MnO, heating said mixture to form a spinel type crystalline structure, grinding the resultant material, wetting said material with a binder agent, forming a molded compressed body from said wetted material, supporting said body on a platinum member, and subsequently sintering said molded body.

4. A method of forming a core body characterized by having improved magnetic properties comprising preparing an intimate mixture of from 35 to 50 mol percent $Fe_2O_3$, 10 to 40 mol percent MgO, and 15 to 50 mol percent MnO, heating said mixture to form a spinel type crystalline structure, grinding the resultant material, wetting said material with a binder agent, forming a molded compressed body from said wetted material, supporting said body on a rhodium-platinum alloy member, and subsequently sintering said molded body.

5. A method of forming a core body characterized by having improved magnetic properties comprising preparing an intimate mixture of 43.3 mol percent $Fe_2O_3$, 32.3 mol percent MgO, and 24.4 mol percent MnO, heating said mixture to form a spinel type crystalline structure, grinding the resultant material, wetting said material with a binder agent, forming a molded compressed body from said wetted material, supporting said body on a rhodium-platinum alloy member, and subsequently sintering said molded body.

6. A method of forming a core body characterized by having improved magnetic properties comprising preparing an intimate mixture of 40.0 mol percent $Fe_2O_3$, 37.5 mol percent MgO, and 22.5 mol percent MnO, heating said mixture to form a spinel type crystalline structure, grinding the resultant material, wetting said material with a binder agent, forming a molded compressed body from said wetted material, supporting said body on a rhodium-platinum alloy member, and subsequently sintering said molded body.

7. A method of forming a core body characterized by having improved magnetic properties comprising preparing an intimate mixture of 42.5 mol percent $Fe_2O_3$, 15.0 mol percent MgO, and 42.5 mol percent MnO, heating said mixture to form a spinel type crystalline structure, grinding the resultant material, wetting said material with a binder agent, forming a molded compressed body from said wetted material, supporting said body on a rhodium-platinum alloy member, and subsequently sintering said molded body.

References Cited in the file of this patent

UNITED STATES PATENTS 2,575,099 Crowley ---------------- Nov. 13, 1951

FOREIGN PATENTS 696,250 Great Britain ----------- Aug. 26, 1953
697,219 Great Britain ----------- Sept. 16, 1953
735,375 Great Britain ----------- Aug. 17, 1955

OTHER REFERENCES

Nature, October 25, 1952, vol. 170, page 707.